J. CRAWLEY.
UNIVERSAL JOINT.
APPLICATION FILED MAY 28, 1920.

1,372,404.

Patented Mar. 22, 1921.

Joseph Crawley  INVENTOR
BY
Geo. B. Willcox  ATTORNEY

UNITED STATES PATENT OFFICE.

JOSEPH CRAWLEY, OF ERIE, PENNSYLVANIA.

UNIVERSAL JOINT.

1,372,404. Specification of Letters Patent. Patented Mar. 22, 1921.

Application filed May 28, 1920. Serial No. 384,998.

*To all whom it may concern:*

Be it known that I, JOSEPH CRAWLEY, a citizen of the United States, residing at Erie, in the county of Erie and State of Pennsylvania, have invented certain new and useful Improvements in Universal Joints; and I do hereby declare the following to be a full, clear, and exact description of the invention, such as will enable others skilled in the art to which it appertains to make and use the same.

This invention relates to flexible shaft couplings, and pertains more particularly to shaft couplings adapted for use in line shafts, direct shaft connections for electric motors and for the connections commonly employed as universal joints in automobile construction.

The objects of my improvement are to provide a flexible shaft coupling of great strength that is capable of being made cheaply and rapidly.

A further object of my invention is to provide a coupling comprising a plurality of flexible cushions inclosed within a housing comprising two members each formed by stamping a single piece of sheet metal, whereby great strength and toughness is imparted to the shell.

With the foregoing and certain other objects in view, which will appear in the specification, my invention comprises the devices described and claimed and the equivalents thereof.

In the drawings, Figure 1 is a face view partly in section, showing the housing and coupling members assembled.

Figure 5:
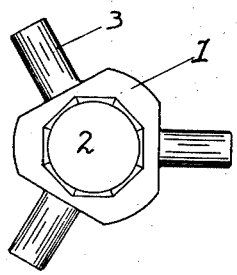
Figs. 5 and 6 are respectively side and edge views of the central hub.
Figure 6:
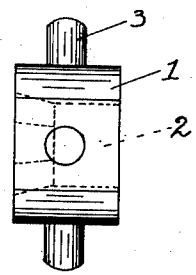

As is clearly shown in the drawings, the coupling consists in the central hub 1, preferably formed of a steel drop forging, this hub having a bore 2 to receive a shaft and provided with a plurality of radial projections 3, as shown in Figs. 5 and 6.

Upon each of the projections 3 is slipped a tubular packing member 4 of rubber or other suitable resilient material, the outer end of the packing member 4 being covered by a washer or disk 5, the diameter of which is substantially equal to the outside diameter of the tubular packing member.

Figure 3:
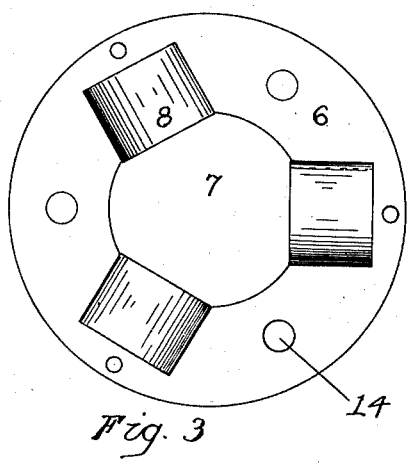
Fig. 3 is a face view of one of the housing plates.
Figure 4:
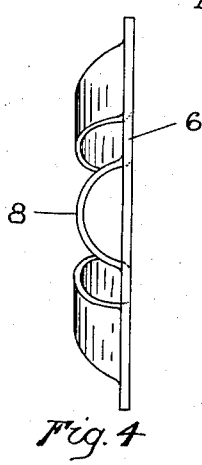
Fig. 4 is an edge view of the parts shown in Fig. 3.
Figure 7:
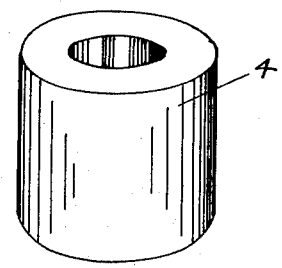
Fig. 7 is a detail of the rubber packing or cushion.

The central hub 1 with its assembled packing members and disks is inclosed within a housing comprising two plates 6 formed of sheet metal stampings, each plate, as shown in Figs. 3 and 4, being formed with a central aperture 7 slightly larger than the outside diameter of the central hub 1, and a plurality of radially disposed pockets 8 formed by pressing up the metal of the plate 6. The two plates 6 are fastened together by means of bolts or other fastenings 9, thereby forming a housing which incloses the central hub and the tubular packing members on the radial projections of the hub.

One of the disks 5 forms a cover for the outer end of each of the packing members 4, the disk being of such diameter as to be received within the two radially disposed pockets 8.

Figure 8:
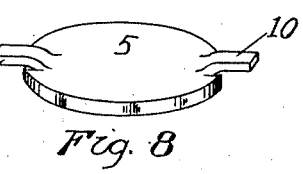
Fig. 8 is a detail of the washer used in connection with the packing.

The disk is prevented from inward movement by means of the lugs 10, 10 formed thereon, preferably by punching up the metal at the edge of the disk, as shown in Fig. 8.

Figure 1:
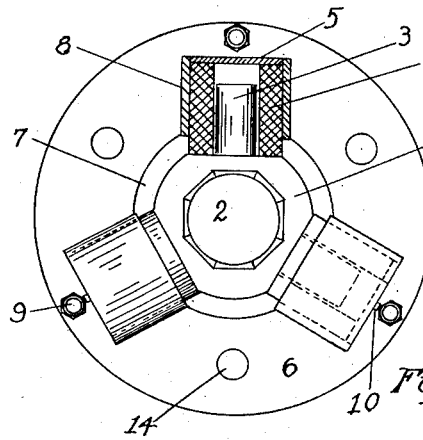
Figure 2:
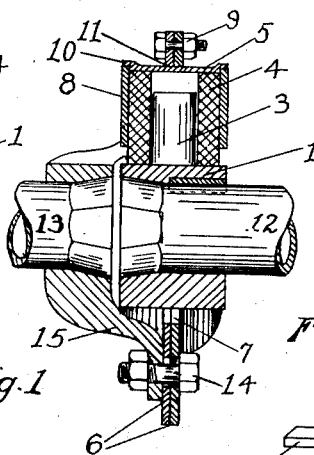
Fig. 2 is a part sectional edge view of the same.

Outward movement of the disk is prevented by its engagement with the edge 11 of the opening in plate 6, as shown in Fig. 2.

Of the two shafts to be connected by the flexible coupling, one shaft 12 is fixed to the hub 1 and the other shaft 13 is fixed to the housing formed by the two plates 6, there being a plurality of through-bolts 14 passing through the two sides of the housing and also thereby securing to the housing, a thimble 15, in the hub of which shaft 13 is rigidly fixed.

Rotation of one of the shafts will produce rotation of the other, the torque or stress being transmitted through the hub of 15 and plates 6, and through the rubber packing and the walls of pocket 8 of the housing, to the other shaft 12, although the shafts need not be in exact alinement, as is usually the case in assemblies where flexible couplings are employed.

By the means above described, I have produced a simple and inexpensive coupling that can be made with a minimum of machined parts, that can be readily assembled, and on account of its housing being made of stamped sheet metal, is light and yet capable of resisting great strains.

Having thus described my invention, what I claim and desire to secure by Letters Patent is:

In a coupling, the combination of a central hub, radial projections on said hub, a tubular flexible cushion member received on each of said projections, and a housing comprising two like plates of sheet metal formed with central apertures and a plurality of pockets formed by pressing up the metal of the plates, and a disk covering the end of each cushion member and forming a closure for said pocket.

In testimony whereof, I affix my signature in presence of two witnesses.

JOSEPH CRAWLEY.

Witnesses:
  Monroe Echols,
  D. S. Covey.